United States Patent [19]

Langreck

[11] Patent Number: 5,488,280
[45] Date of Patent: Jan. 30, 1996

[54] ADAPTIVE CONTROL OF A MULTIPHASE INDUCTION MOTOR HAVING CONCENTRATED PHASE WINDINGS

[75] Inventor: Gerald K. Langreck, Phillips, Wis.

[73] Assignee: Marquip, Inc., Phillips, Wis.

[21] Appl. No.: 233,119

[22] Filed: Apr. 26, 1994

[51] Int. Cl.$^6$ .................................................. H02P 5/40
[52] U.S. Cl. ...................... 318/805; 318/807; 318/809; 318/432; 310/166
[58] Field of Search ...................... 318/432, 800, 318/803, 805, 807, 810, 811, 798, 809; 310/67 R, 166, 208, 172

[56] References Cited

U.S. PATENT DOCUMENTS

| | | | |
|---|---|---|---|
| 4,047,083 | 9/1977 | Plunkett | 318/805 |
| 4,088,935 | 5/1978 | D'Atre et al. | 318/805 |
| 4,243,927 | 1/1981 | D'Atre et al. | 318/810 |
| 5,272,429 | 12/1993 | Lipo et al. | 318/808 |
| 5,334,923 | 8/1994 | Lorenz et al. | 318/805 |

*Primary Examiner*—John W. Cabeca
*Attorney, Agent, or Firm*—Andrus, Sceales, Starke & Sawall

[57] ABSTRACT

A multiphase induction motor having concentrated phase windings utilizes adaptive torque control based on detection of asymmetry in the magnetic field density and corrective adjustment to restore symmetry based on voltage differences in the torque phase motor windings.

7 Claims, 6 Drawing Sheets

ADAPTIVE CONTROL OF A MULTIPHASE INDUCTION MOTOR HAVING CONCENTRATED PHASE WINDINGS

BACKGROUND OF THE INVENTION

The present invention pertains to induction motors and, more particularly, to an induction servomotor system utilizing a multiphase induction motor having concentrated phase windings.

The use of adaptive control for correcting slip frequency in conventional three-phase induction motors is known in the art. Direct field oriented controllers which require the use of invasive sensing devices, such as Hall effect sensors placed in the magnetic field gap, have generally proven to be impractical. Slip control based on indirect sensing of the magnetic field has also been accomplished. However, because of the distributed nature of the phase windings in a conventional three-phase induction motor, it has proven difficult to separate and accurately sense the stator current components responsible for torque from the magnetizing currents used to generate the field. Furthermore, the magnetic field generated in a conventional three-phase induction motor is sinusoidal in nature making it difficult to sense the peak flux density. The problem is worse at low speeds because the distributed nature of the windings makes it difficult to segregate and sense the relatively lower torque current and voltage values from the dominant IR drop resulting from magnetizing currents in the same phase windings.

Permanent magnet motors are desirable for servomotor applications because of their high bandwidth capability and high efficiency. However, permanent magnet servomotors are substantially more costly to manufacture than induction servomotors. Also, as indicated, slip frequency control in AC induction motors has been difficult to attain.

SUMMARY OF THE INVENTION

In accordance with the present invention, a multiphase induction motor is constructed with concentrated phase windings which are completely isolated from one another. This construction allows commutated magnetizing currents to be utilized to generate a uniform magnetic field adjacent the windings carrying the torque-producing currents and in which there are no magnetizing currents present. Distortion or asymmetry in the trapezoidal magnetic field curve is readily determined by measuring differences in the voltage in the windings receiving torque currents only and utilizing the sensed voltage difference to adjust the slip between the commutated magnetic field and the rotor speed. Since the torque currents are the same magnitude and the resistance of each phase is essentially the same value, the dominant IR drop is essentially canceled when sensing the voltage difference.

In accordance with one embodiment, a multiphase servomotor system for an induction motor has concentrated stator windings of more than three phases and includes means for directing commutated magnetizing current into selected stator phase windings to create a commutated magnetic field within a given peripheral portion of the air gap between the stator and a rotor which is operating therein. Means are also provided for directing commutated torque currents into the stator phase windings which correspond to the position of the commutated magnetic field. Means are also provided for non-invasively measuring variations in the magnetic field density over the given peripheral portion of the gap, which variations result from differences between the stator torque currents and corresponding currents induced in the rotor. To eliminate variations in the magnetic field and maintain a uniform flux, means are provided for adjusting the slip speed between the commutated magnetic field and the rotor speed.

To measure variations in the uniformity of the magnetic field density, means are provided for sensing the voltages in two stator phase windings carrying torque currents. Adjustment of the slip speed may comprise means for comparing the difference between the sensed stator winding voltages and for adjusting the ratio of slip speed to torque currents to eliminate the difference. In a presently preferred embodiment, the motor is provided with at least four concentrated phase windings and commutation is controlled so that at least two phases are receiving torque currents at any one time.

In accordance with another embodiment, a multiphase induction motor includes a stator having at least four mutually isolated concentrated phase windings, a phase matched motor drive adapted to direct into the phase windings commutated magnetizing currents to produce a commutated magnetic field in the gap between the stator and a rotor operating therein, and commutated torque currents to rotatably drive the rotor in a manner in which at least two of the phase windings are receiving only torque currents at all times, and means for sensing asymmetry in the commutated magnetic field and for adjusting the slip between the speeds of the commutated field and the rotor to restore magnetic field symmetry. The means for sensing asymmetry preferably comprises means for sensing and comparing the voltage of the phase windings receiving torque currents, and the motor drive preferably comprises a pulse width modulated drive including means for accessing the pulse width control command signals to provide indications of phase winding voltage.

DETAILED DESCRIPTION OF THE PREFERRED EMBODIMENT

Figure 1:
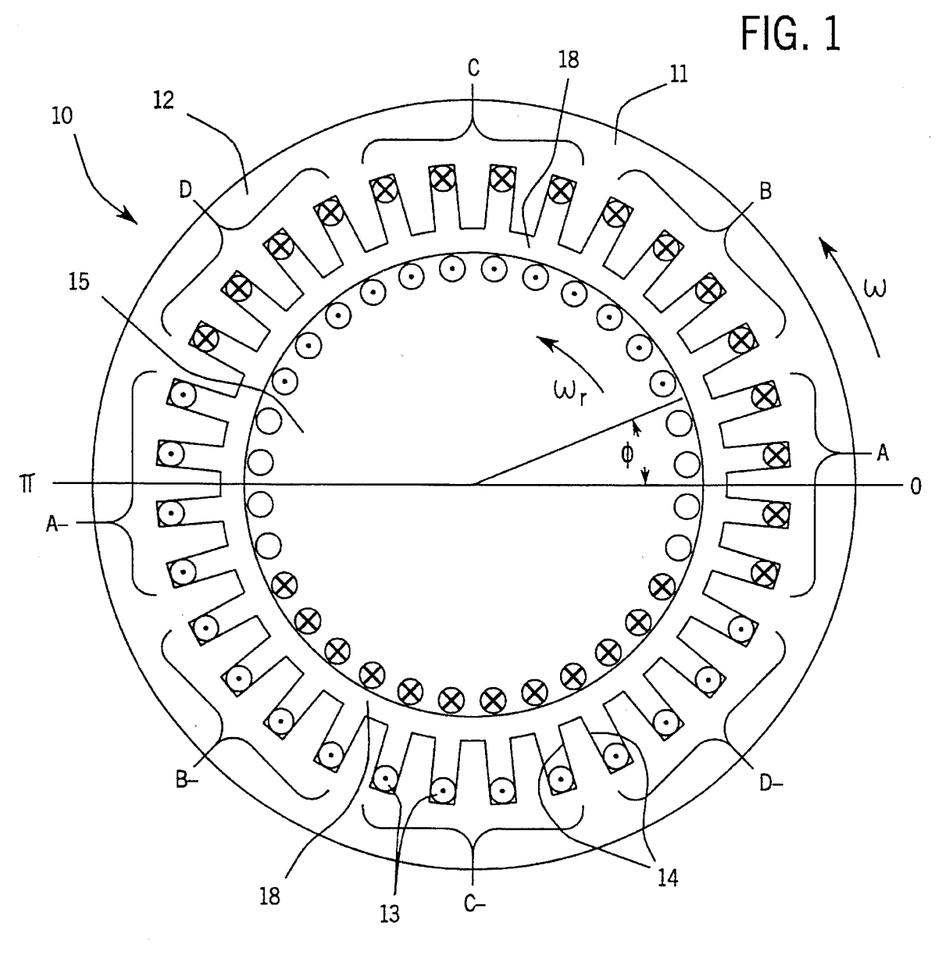
FIG. 1 is a schematic representation of a section through the multiphase induction motor of the present invention taken on a plane normal to the axis of rotation of the motor.

The schematic depiction of the multiphase induction servomotor 10 in FIG. 1 shows a two-pole four-phase construction comprising phase windings A–D distributed evenly around the periphery of the stator 11. The stator may comprise a conventional construction consisting of a laminated series of slotted stator plates 12 (only one of which is shown) with the coils comprising the phase windings 13 disposed in the slots 14 in the usual way. However, unlike the distributed winding pattern typical of conventional three-phase induction motors in which the total slot space around the stator periphery is divided equally between the phases with each winding placed symmetrically therein, the stator 11 of the motor of the present invention utilizes concentrated windings 13 for each phase with the windings in each phase completely isolated from the others. In this manner, the commutated magnetizing currents and torque currents can also be isolated to the extent necessary to allow the mismatch between applied torque currents and the corresponding currents induced in the rotor 15 and the effect thereof on the desired uniform symmetrical magnetic field density to be determined.

Figure 13:
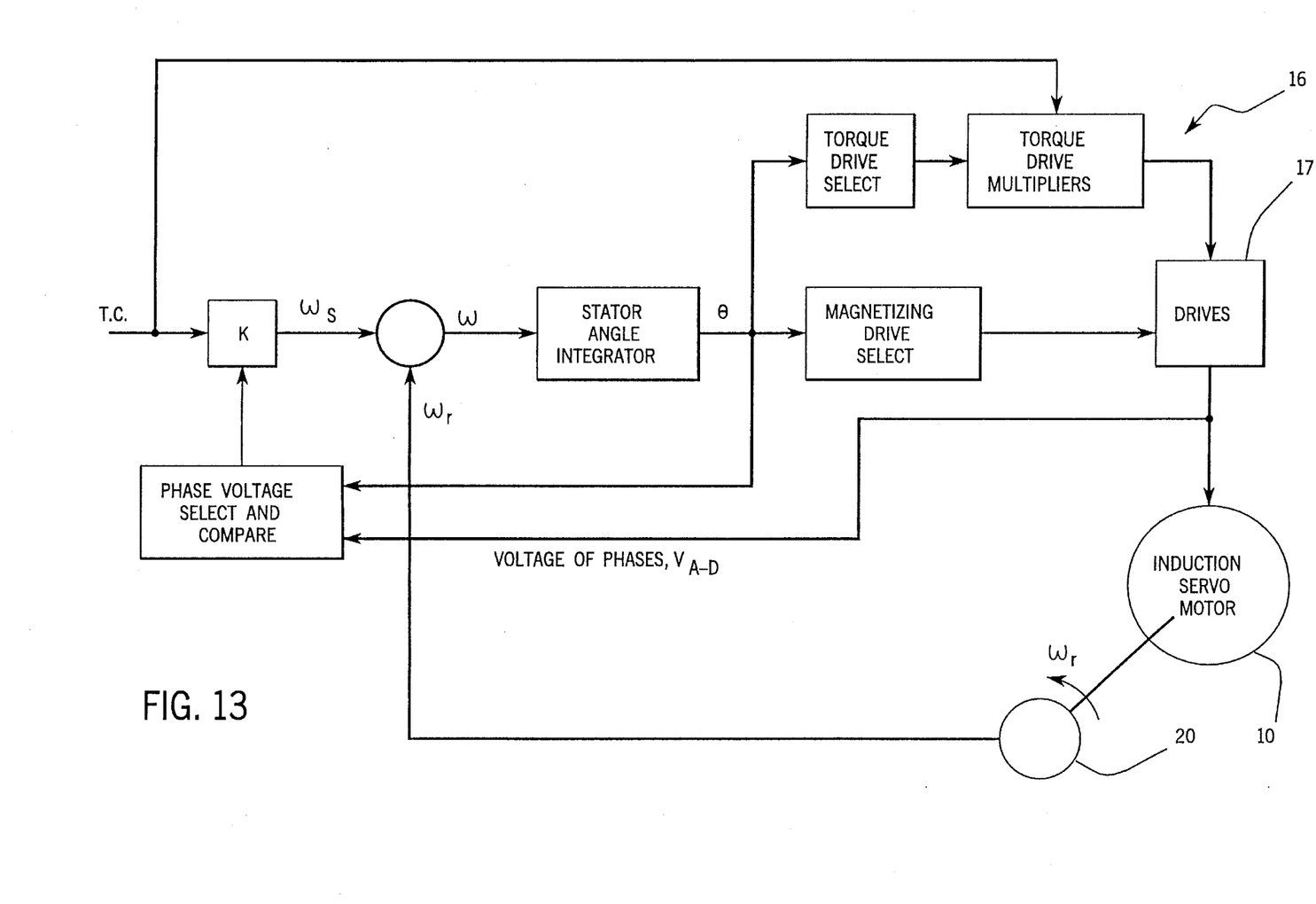
FIG. 13 is a schematic drawing of the adaptive control system for the multiphase motor of the present invention.

As shown in FIGS. 1 and 13, magnetizing currents are injected into selected phase windings A–D by the use of a phase matched motor drive 16 which may comprise a conventional pulse width modulated (PWM) drive 17. It is believed that a more recently developed resonant link drive would also be suitable. In general, a suitable drive utilizes a voltage command control signal to place a voltage on the motor winding proportional to the control signal voltage. To control current and torque, the drive varies the voltage to the winding by way of the voltage command control signal. Any of a number of readily available PWM servo amplifiers would be suitable for motor drive 16.

Figure 2:
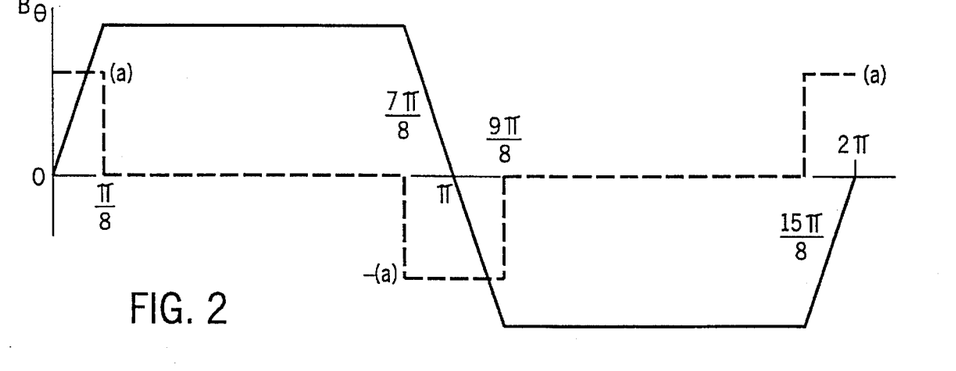
FIG. 2 is a graph showing the magnetizing current density and resultant magnetic field density generated by the magnetizing windings of the motor shown in FIG. 1 when the slip speed is correct.

The commutated magnetizing currents are normally supplied to no more than two phase windings at any one time. For the purposes of this description, however, it will be assumed that the FIG. 1 schematic of the motor 10 is captured at the instant when magnetizing currents are being delivered to phase A windings only. Because of the concentrated nature of the phase windings, there are no magnetizing currents in any of the windings of phases B, C and D at that instant. Without the application of any torque currents to the windings of phases B–D, the current density (a) in the windings around the periphery of the motor would appear as shown by the dashed line in FIG. 2. The corresponding magnetic field density (B), resulting from the magnetizing current (a), is represented by the solid line in FIG. 2. The magnetic field density (B) in a motor of the present construction is characterized by its uniform density in the portion of the air gap 18 around the peripheral portion of the motor corresponding to the positions of phase windings B–D in the example of FIGS. 1 and 2. The magnetic field verses angle around the periphery of the air gap 18 is in the shape of a symmetric trapezoid with a similar oppositely directed field displaced 180° ($\pi$ radians) opposite thereto and having the same symmetric trapezoidal shape.

Figure 3:
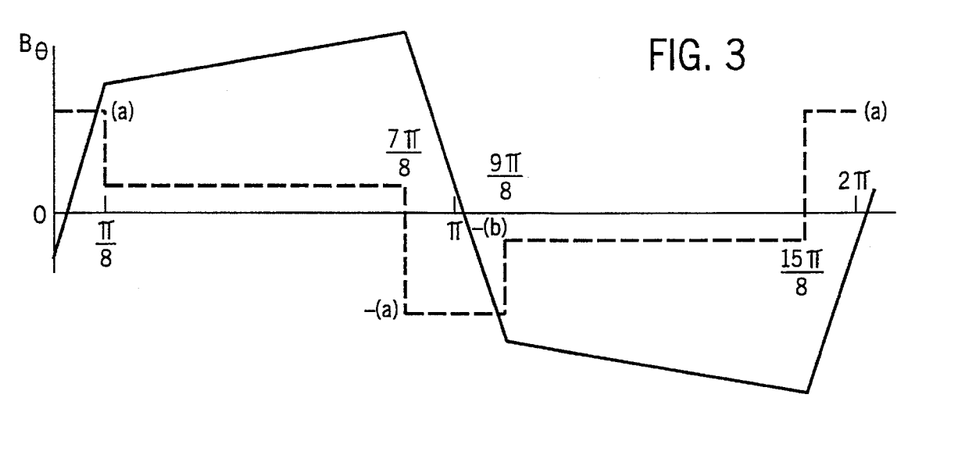
FIG. 3 is a graph similar to FIG. 2 showing the mismatch current density and corresponding distortion in the magnetic field density resulting from incorrect slip.
Figure 4:
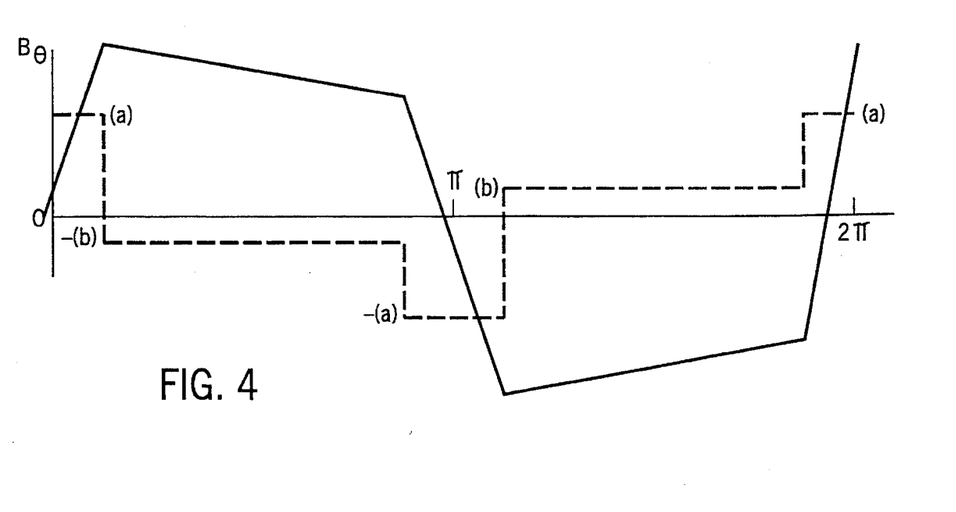
FIG. 4 is a graph similar to FIG. 3 showing the distortion in the magnetic field density as a result of a negative mismatch current density.

To actually operate the motor, of course, commutated torque currents must also be supplied to the torque windings (phases B–D in the FIG. 1 example) to induce opposing driving torque currents in the rotor 15. If the slip speed, $\omega_s$, which is the difference between the rotational speed of commutation $\omega$, and the rotational speed of the rotor $\omega_r$, is correct, then the torque currents in the windings of phases B–D will induce substantially equal and opposite currents in the rotor 15 and there will be no effect on the field density (B) or current density (a) curves shown in FIG. 2. The result will be uniform torque generation. However, if the slip $\omega_s$ is not correct, the torque currents in the stator phase windings 13 will not induce the corresponding equal and opposite currents in the rotor 15. Slip may vary, for example, as a result of winding resistance changes caused by temperature variations. With incorrect slip, portions of the torque currents directed to the various phase windings have a magnetizing or demagnetizing effect on the flux as shown in FIGS. 3 and 4. Torque currents which do not induce equal and opposite currents in the rotor result in a current mismatch (b) between the stator 11 and the rotor 15 which effects the current density verses position $\theta$ around the motor periphery as shown by the positive current mismatch in FIG. 3 and the negative current mismatch in FIG. 4. For example, as the temperature of the rotor increases, the slip speed must be increased to get the same amount of current induced in the rotor. If slip speed is not increased, the lower rotor current will result in a mismatch. The magnetizing or demagnetizing effect of these mismatch currents (b) distorts the symmetric trapezoidal shape of the magnetic field density (B), resulting in a non-uniform flux density in the air gap where torque currents are injected. The result is an oscillation in motor torque at the slip frequency.

The construction of the multiphase motor of the present invention with concentrated phase windings permits ready detection of the mismatch currents via direct sensing of the voltage in the torque windings where there is no distorting effect of magnetizing currents. The relationship between magnetic field density and the current which produces it is established by Ampere's circuit law and, in an induction motor utilizing concentrated phase windings, the only elements of current producing or affecting the magnetic flux density (B) in the air gap are the magnetizing currents (a) (which are known) and the mismatch torque currents (b), the magnetizing effect of which distorts the flux density curve in the air gap. Thus, the voltages induced in the torque windings as a result of torque current mismatch provide a direct indication of magnetic field density distortion.

In order to calculate the actual magnetic flux density (B) the application of Ampere's circuit law to the motor 10 of the present invention results in the following equation:

$$B_\theta = \frac{\mu_0}{g} \int_0^\theta J_\theta \frac{r}{N} d\theta + B_0 \tag{1}$$

In equation (1):

$\mu_o$=magnetic constant g=motor air gap (m)

J=surface current density (A/m)

r=radius (m)

N=number of pole pairs $\theta$=electrical angle (radians)

$B_o$=flux density constant

As may be seen in FIG. 3, the current density J (and therefore the flux density (B)) changes at five specific points around the periphery of the motor, namely, at $\theta=0$ (or $2\pi$), $\pi/8$, $7\pi/8$, $9\pi/8$ and $15\pi/8$. The surface current density J comprises the net effect of the magnetizing current density (a) and the mismatch current density (b). The constant $B_0$ is determined from Gauss' magnetic law which provides that the sum of the flux around the air gap is zero. Solving equation (1) for $B_{74}$, by performing the integration between each adjacent pair of the foregoing positions, results in the characteristic asymmetric flux density curve shown.

Figure 5:
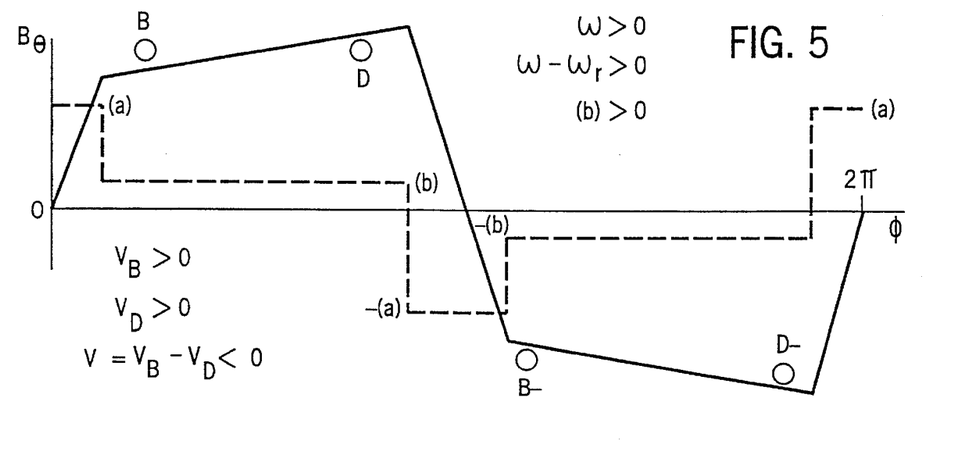
FIGS. 5–12 are schematic representations of the distorted magnetic field density, similar to FIGS. 3 and 4, showing the eight specific conditions of incorrect slip which may occur and the relation between flux density and voltage in the various phases, and the required slip correction to restore symmetry.

Referring now to FIGS. 5–12, there are shown the eight specific conditions of flux density asymmetry which can occur in a motor of the subject invention, with the corresponding phase winding voltages for each of these conditions superimposed thereon along with the required corrective action to provide adaptive torque control. Each of the graphs of FIGS. 5–12 reflects the instantaneous phase relationships shown in FIG. 1. In each of these examples commutation is being carried out in either a counterclockwise direction ($\omega>0$) or a clockwise direction ($\omega<0$). The torque commands from the drive 16 may be either positive or negative. Rotation of the rotor $\omega_r$ is in the counterclockwise direction ($\omega_r>0$). In FIG. 5, the magnetic field density distribution shows that the rotor current density is not high enough, resulting in a positive mismatch current density (b) as previously shown in FIG. 3. In the conditions shown in FIG. 5, the slip $\omega_s=(\omega-\omega_r)>0$. The magnitude of the slip is not great enough to induce the required rotor torque currents. Looking at the corresponding relative phase winding voltages, superimposed on the magnetic field density curve of FIG. 5, the two phases B and D, defining the opposite ends of the three torque producing windings, were chosen. The voltage of the B phase is positive ($V_b>0$) and the voltage of the D phase is also positive ($V_d>0$). However, because the magnetic field density (B) is greater in the D phase, the magnitude of the voltage will be greater in that phase than in the B phase. Therefore, the voltage differential $V=V_b-V_d$ will be negative and the magnitude of the slip must be increased by the gain constant K. The gain constant K is calculated in the microprocessor forming a part of the motor drive 16 based on the phase voltage signals and the torque command (TC) voltage signals to adjust the ratio of the slip speed $\omega_s$ to the torque currents.

Figure 6:
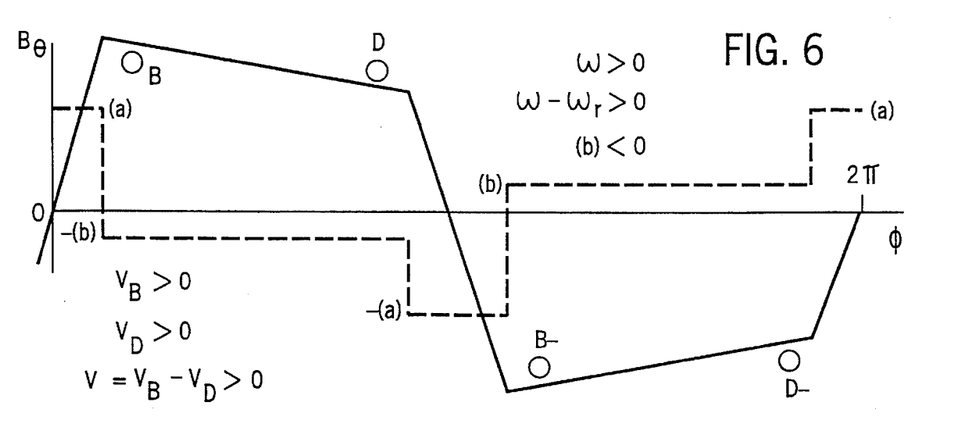

In FIG. 6, the instantaneous conditions are the same as in FIG. 5 except that the magnetic field distribution is distorted such that the magnetic field density is greater in the gap adjacent the phase B windings than the phase D windings. Both phase winding voltages $V_b$ and $V_d$ are positive. In this case, however, the greater magnetic field density (B) in the B phase results in a voltage differential $V=V_b-V_d$ which is positive and the magnitude of the slip must be decreased by the calculated gain constant K.

Figure 7:
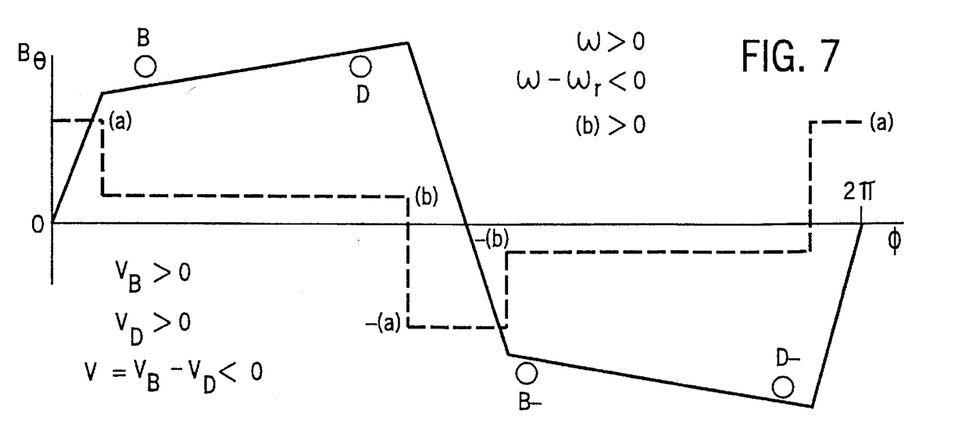
Figure 8:
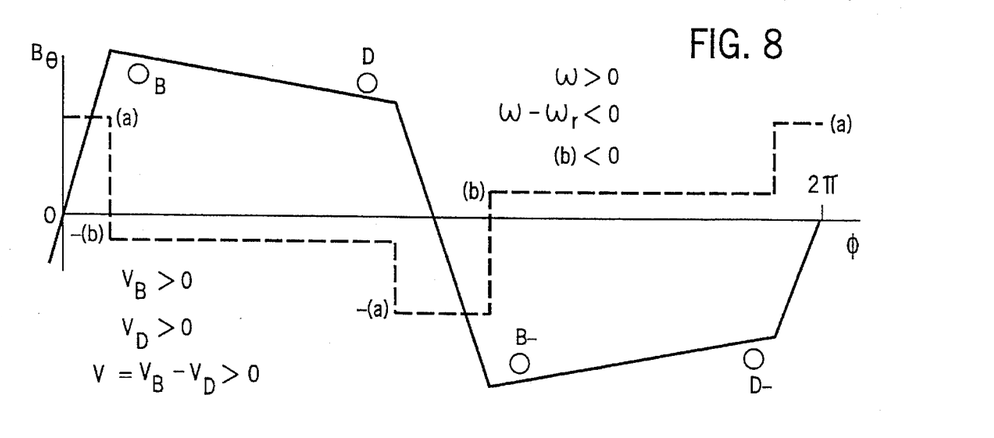

The conditions in FIGS. 7 and 8 correspond, respectively, to FIGS. 5 and 6, except that the torque commands (TC) in FIGS. 7 and 8 are negative ($\omega-\omega_r<0$). The distribution of the magnetic field density (B) in FIG. 7 indicates that the mismatch current density (b) is positive and the rotor current is, therefore, too high. Therefore, the slip $\omega_s$ is too great and the gain constant K should be decreased. In FIG. 8, the negative mismatch current density (B) indicates that the rotor current density is too low, the slip magnitude $\omega_s$ is not great enough, and the gain constant K should be increased.

The graphs for FIGS. 9–12 may be analyzed in a manner similar to those of FIGS. 5–8 described above. Determination of the gain constant K requires calculations using variables which are known and readily determined from the drive controller. Commutation speed $\omega$ is always known and the rotor speed $\omega_r$ is also readily measured and available, as from an encoder 20 or any similar device which can provide a measurement of rotor speed and position. The sign of the slip speed is determined from $\omega_s=\omega-\omega_r$. The voltage difference V between the torque phase windings is always determinable from the phase voltage signals, e.g. $V_b$ and $V_d$ and, therefore, the magnitude and sign of the voltage difference V can always be calculated. Table 1 below summarizes the adaptive control direction of the gain constant K required to eliminate magnetic field density asymmetry and corresponding variations in torque output. The direction of magnetic field commutation $\omega$ is always known, the direction of the torque commands TC is the same as the slip $\omega_s$ and the voltage differences V are determined as indicated above.

TABLE 1

Figure 9:
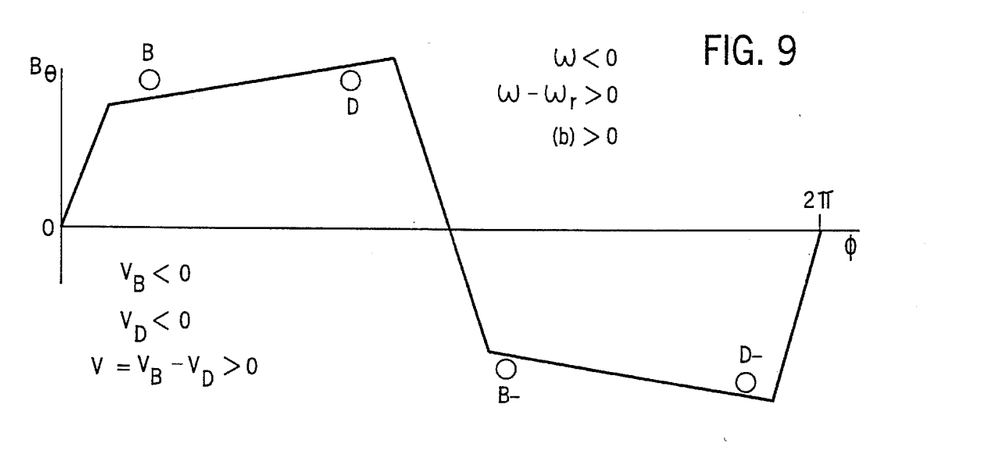
Figure 10:
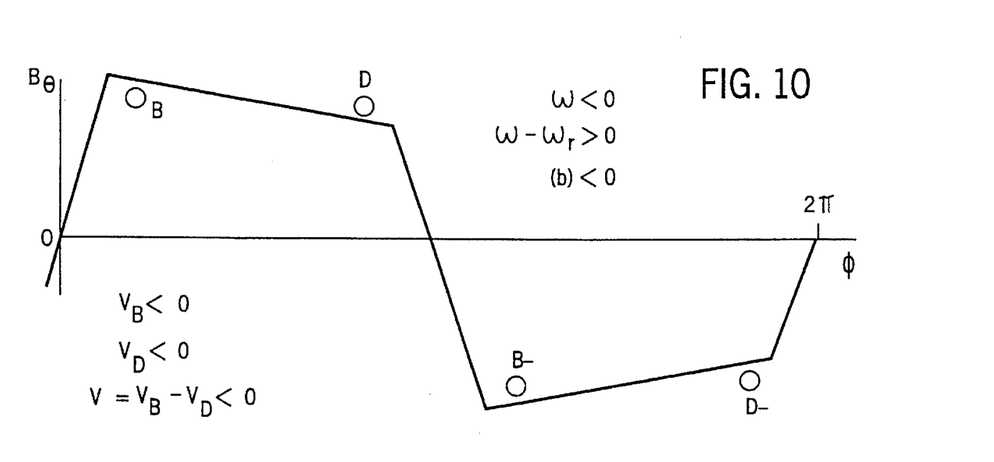
Figure 11:
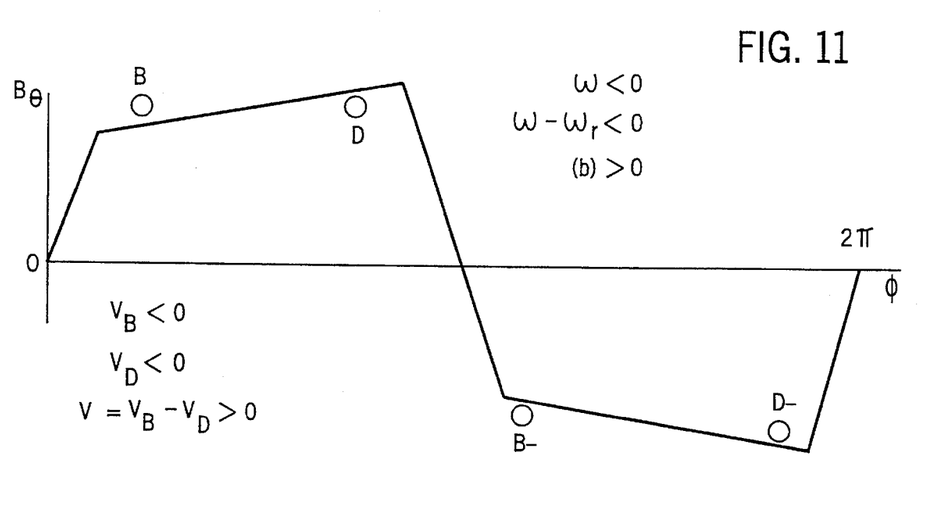
Figure 12:
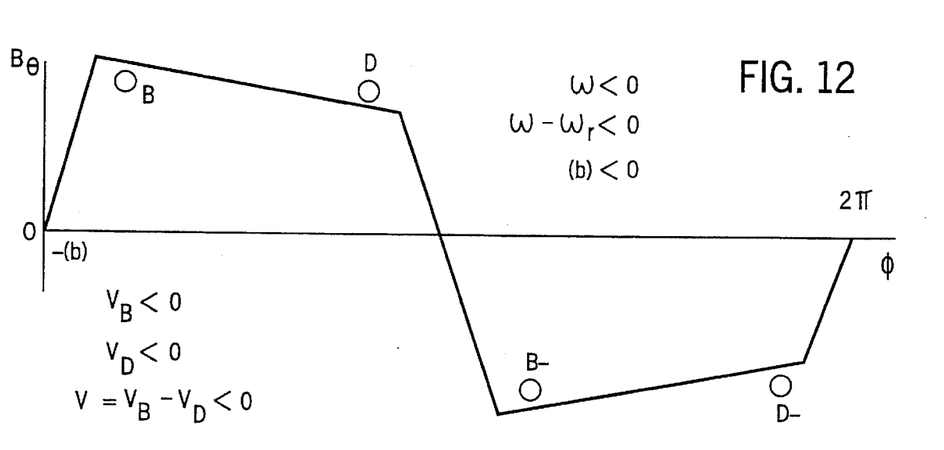

| | | | | |
|---|---|---|---|---|
| FIG. 5  | $\omega>0$ | TC > 0 | V < 0 | K+ |
| FIG. 6  | $\omega>0$ | TC > 0 | V > 0 | K– |
| FIG. 7  | $\omega>0$ | TC < 0 | V < 0 | K– |
| FIG. 8  | $\omega>0$ | TC < 0 | V > 0 | K+ |
| FIG. 9  | $\omega<0$ | TC > 0 | V > 0 | K+ |
| FIG. 10 | $\omega<0$ | TC > 0 | V < 0 | K– |
| FIG. 11 | $\omega<0$ | TC < 0 | V > 0 | K– |
| FIG. 12 | $\omega<0$ | TC < 0 | V < 0 | K+ |

In each of the foregoing examples, only one phase (i.e. phase A) was assumed to be magnetizing, while the other three phases (i.e. phases B, C and D) were assumed to be in torque. This, however, is an instantaneous situation and, more typically, any two adjacent phases will normally be magnetizing and the other two phases in torque at any one time. Nevertheless, as long as there are torque currents being carried by two phases, the voltage difference between the windings of those phases can be determined in exactly the manner set forth above. As indicated, the voltage difference is representative directly of the mismatch current density (b) and the corresponding difference in the magnetic flux density (B) in the gap corresponding to those phases.

Various modes of carrying out the present invention are contemplated as being within the scope of the following claims particularly pointing out and distinctly claiming the subject matter which is regarded as the invention.

We claim:

1. A multiphase servomotor system for an induction motor having concentrated stator windings of more than three phases comprising:

means for directing commutated magnetizing current into selected stator phase windings to create a commutated magnetic field within a given peripheral portion of the air gap between the stator and a rotor operating therein;

means for directing commutated torque currents into the stator phase windings corresponding to the position of the commutated magnetic field;

means for non-invasively measuring variations in the magnetic field density over said given peripheral portion; and, means for adjusting a slip speed between the commutated magnetic field and rotor speed in response to the magnetic field density measurements to maintain a uniform commutated magnetic field.

2. The apparatus as set forth in claim 1 wherein said means for measuring variations in the magnetic field density comprises means for sensing the voltages in two stator phase windings carrying torque currents.

3. The apparatus as set forth in claim 2 wherein said means for adjusting the slip speed comprises means for comparing the difference between the sensed stator winding voltages and for adjusting the ratio of slip speed to torque currents to eliminate said difference.

4. The apparatus as set forth in claim 2 wherein the motor includes at least four concentrated phase windings and commutation is controlled to provide torque current to at least two phases at all times.

5. A multiphase induction motor comprising:

a stator having at least four mutually-isolated concentrated phase windings;

a phase matched motor drive adapted to direct into the phase windings commutated magnetizing currents to produce a commutated magnetic field in the gap between the stator and a rotor operating therein and commutated torque currents to rotatably drive the rotor in a manner in which at least two of the phase windings are receiving only torque currents at all times; and, means for sensing asymmetry in the commutated magnetic field and for adjusting a slip between the speeds of the commutated magnetic field and the rotor to restore magnetic field symmetry.

6. The induction motor as set forth in claim 5 wherein said means for sensing asymmetry in the magnetic field comprises means for sensing and comparing the voltage of the phase windings receiving torque currents only.

7. The induction motor as set forth in claim 6 wherein said motor drive comprises a pulse width modulated drive and the means for sensing phase winding voltage includes means for accessing the pulse width control command signals of said drive.

* * * * *